June 29, 1926.

C. C. BALSTON

COMBINED KEYBOARD AND CHART

Original Filed Oct. 17, 1924    9 Sheets-Sheet 1

1,590,998

June 29, 1926.

C. C. BALSTON 1,590,998

COMBINED KEYBOARD AND CHART

Original Filed Oct. 17, 1924  9 Sheets-Sheet 2

Witnesses:
Inventor
C. C. Balston
By his Attorney

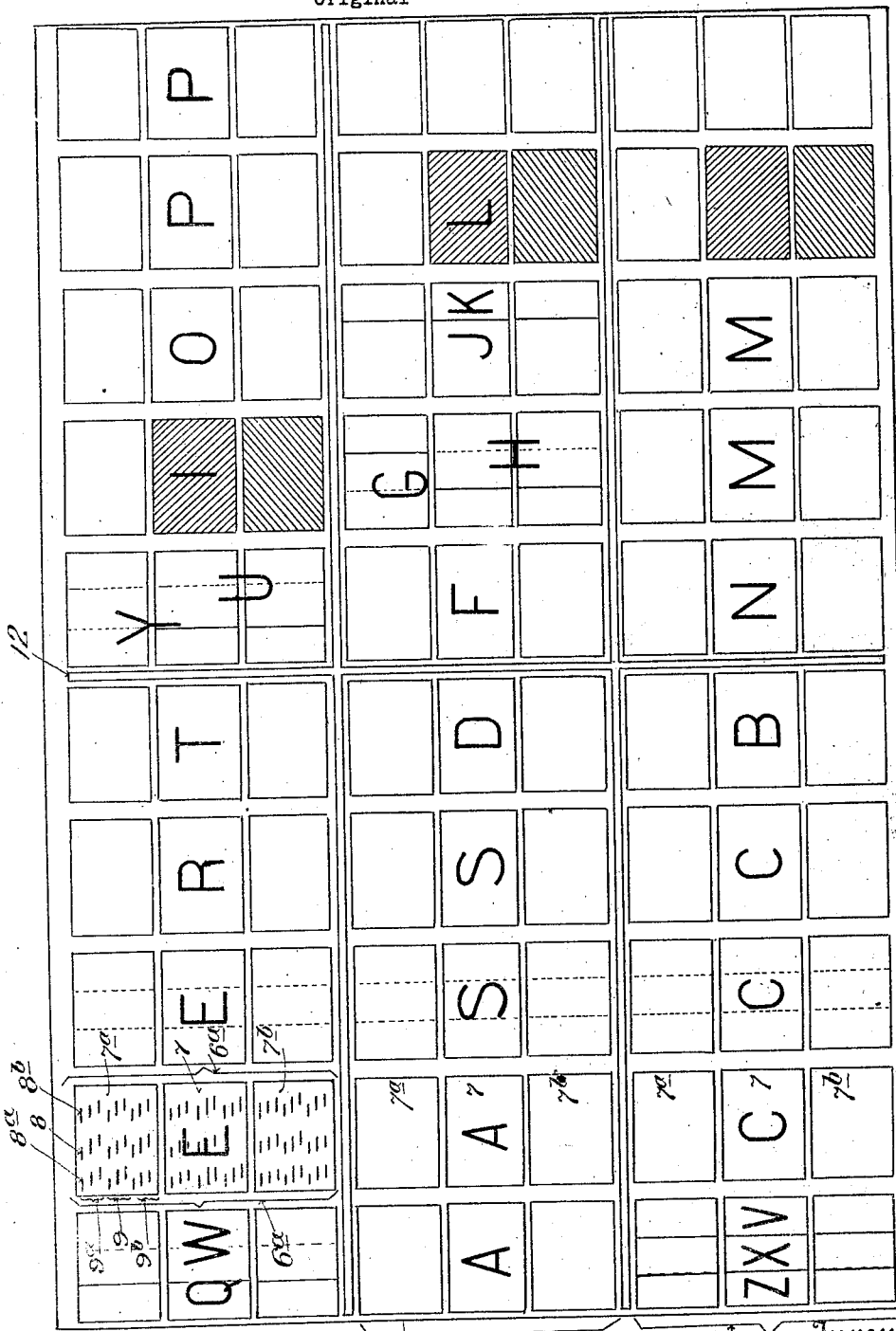

June 29, 1926.

C. C. BALSTON 1,590,998

COMBINED KEYBOARD AND CHART

Original Filed Oct. 17, 1924   9 Sheets-Sheet 4

Witnesses:
C W Benjamin
Marie F. Wainright

Inventor
C. C. Balston
By his Attorney
T. F. Bourne

June 29, 1926. 1,590,998

C. C. BALSTON

COMBINED KEYBOARD AND CHART

Original Filed Oct. 17, 1924  9 Sheets-Sheet 5

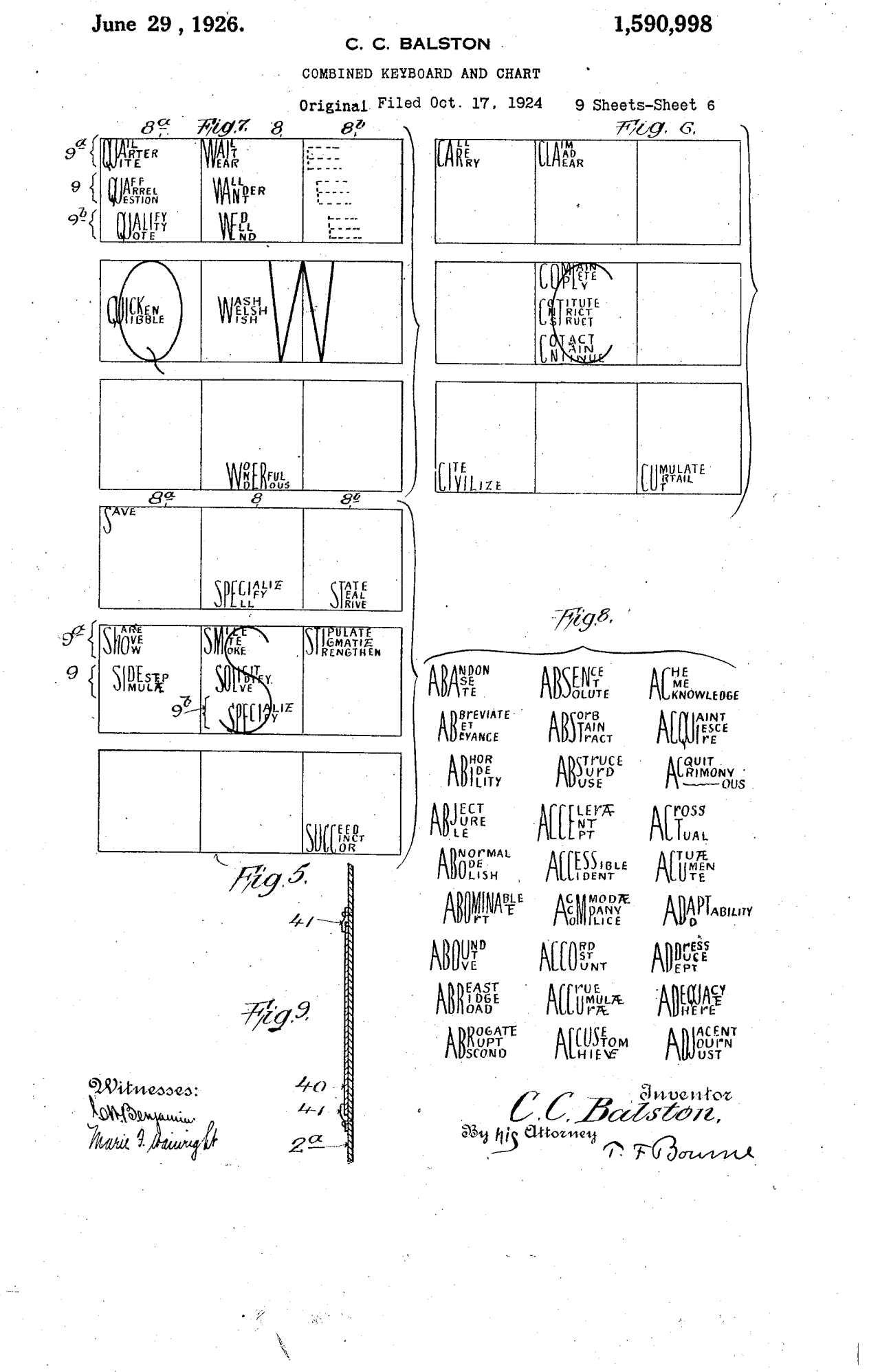

June 29, 1926.

C. C. BALSTON

COMBINED KEYBOARD AND CHART

Original Filed Oct. 17, 1924    9 Sheets-Sheet 6

June 29, 1926.
C. C. BALSTON
1,590,998
COMBINED KEYBOARD AND CHART
Original Filed Oct. 17, 1924   9 Sheets-Sheet 7
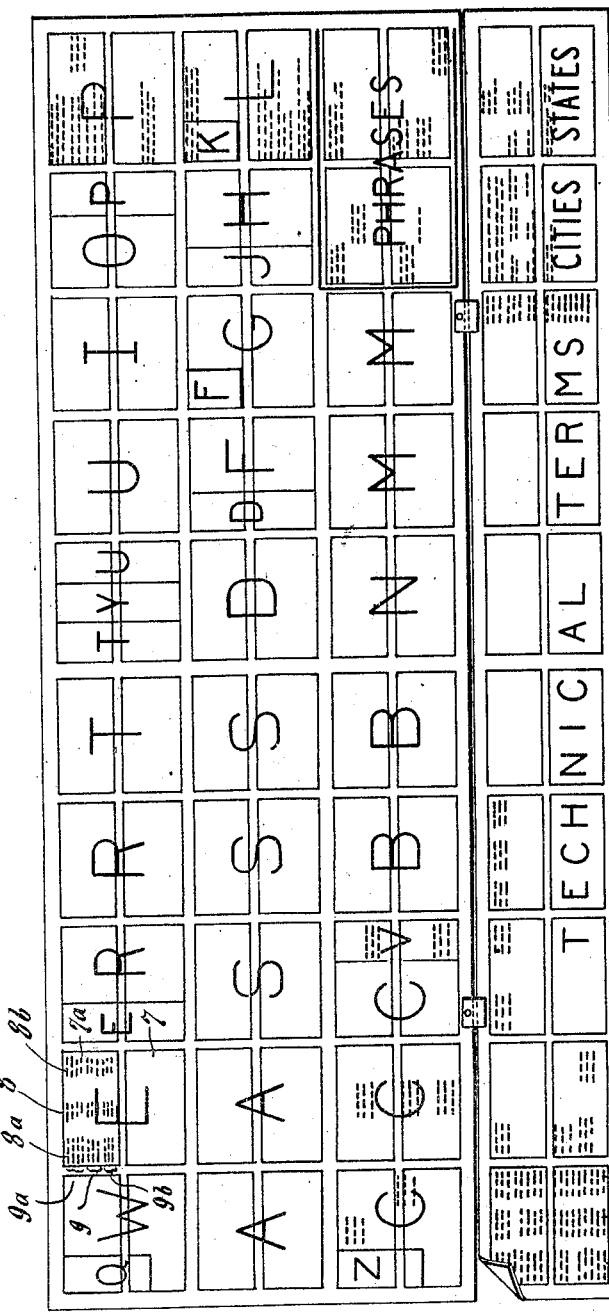
INVENTOR
C.C. Balston
BY
J. F. Bourne
ATTORNEY June 29, 1926.

C. C. BALSTON

COMBINED KEYBOARD AND CHART

Original Filed Oct. 17, 1924  9 Sheets-Sheet 8

1,590,998

INVENTOR
C. C. Balston
BY
T. F. Bourne
ATTORNEY

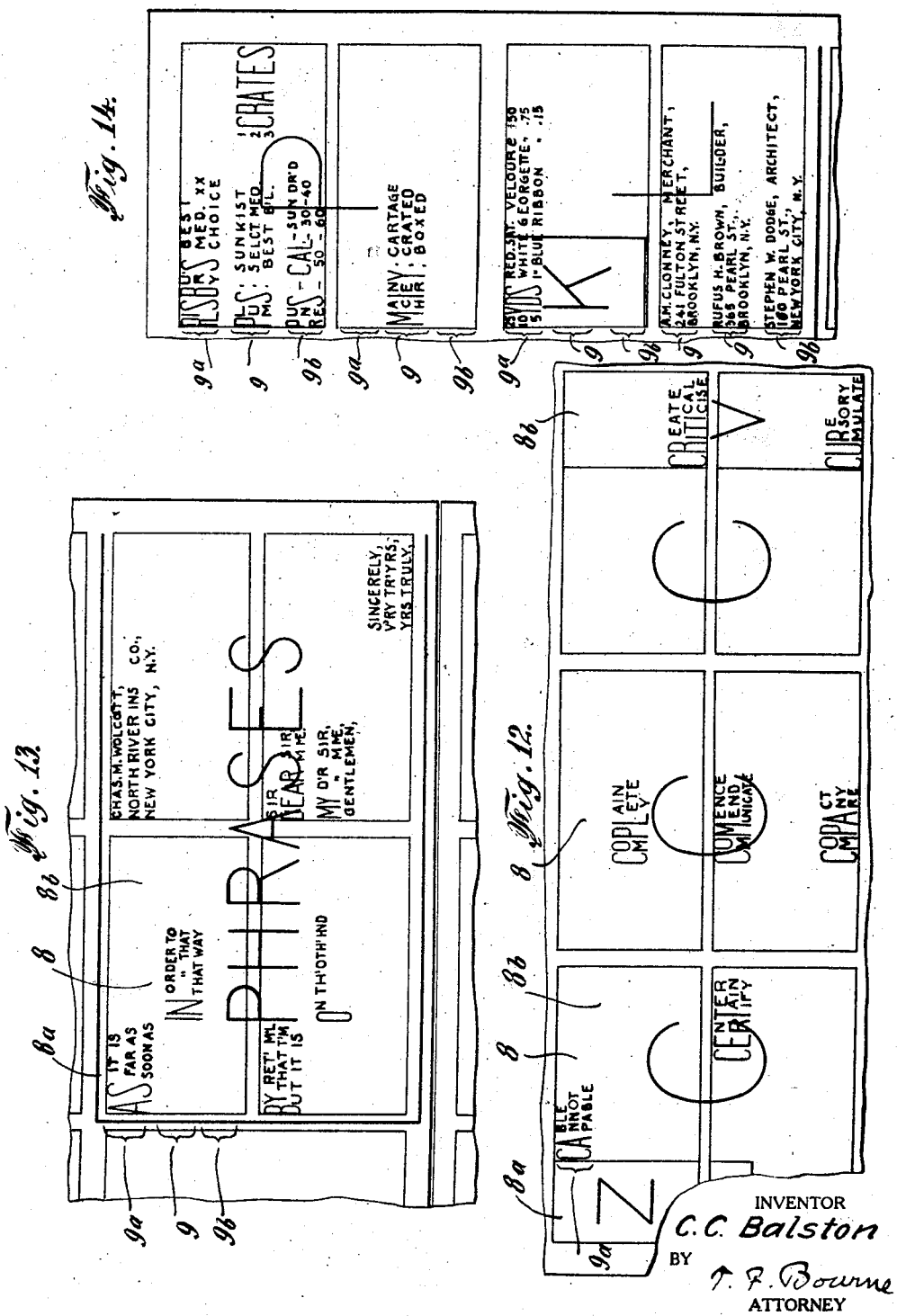

Patented June 29, 1926.

1,590,998

UNITED STATES PATENT OFFICE.

CLYDE C. BALSTON, OF NEW YORK, N. Y.

COMBINED KEYBOARD AND CHART.

Application filed October 17, 1924, Serial No. 744,286. Renewed November 19, 1925.

My invention relates to a combined keyboard and word and phrase chart or other printed designations to be used separately or in conjunction therewith, adapted for use in connection with typewriting machines of the class known as word writing machines, and for other classes of machines and the purposes to which the invention may apply, and the objects of my invention are to provide such a key-board and chart for use alone or in conjunction one with another to enable the type combination-forming or other factor assembling mechanism of the writing or other machine to be controlled thereby, the mechanism for selecting and impressing the type forming no part of my present invention, except that for single letter writing or for setting other single factors or representations a portion of the key-board may be used in the ordinary manner like the operation of an ordinary typewriting machine.

By means of my invention, as far as producing words and phrases, and parts thereof, or numerals, etc. separately or therewith, is concerned, for instantaneous impression, the key-board and chart obviate the necessity of the operator knowing how to spell any such words or phrases, rates, numbers, etc., or having to correctly set the numeral type for fixed charges or items, or having to do with the order of characters in a word or phrase, or of the numerals constituting a whole fixed number, columns thereof, charge items, etc. or the spaces after the word and between words of a phrase, and the operator, furthermore, ordinarily deals with no parts of the word individually when producing words or phrases or with the integral parts of a complete number of combined numerals for single or plural columns thereof, whether with or without letter type. Although suffixes and prefixes may be automatically added or impressed separately, under ordinary conditions the desired word may be impressed instantaneously with its prefix or suffix without requiring the separate impressing thereof with respect to the impression to produce the main part or stem of the word, the entire word being produced instantaneously with its prefix or suffix, mainly by the operation of but two keys and in special instances by the operation of a single key, and final letters of words automatically changed to other appropriate letters by the action of the suffix keys,—as, for instance, final e to i in producing words ending in "ing", and final y to ies in plural forms, etc.

In order to simplify the description I shall confine myself mainly for descriptive purposes to the description of the layout and selection and key manipulation for the production of single character letter type, and for the automatic production of words and phrases. It will be understood that groups of numbers, names of persons, articles, addresses, whole lines, etc. and whatever other indications, and for whatever purpose to which a chart and keyboard may apply, may take the place of the words and phrases indicated on the main chart, or on the auxiliary chart, or both, alone or combined, and on the corresponding keys. For instance, I may make the chart and keyboard adapted to the purposes as set forth in the objects enumerated herein applicable to many other purposes in which lists of names, billing items, or whole numbers singly or combined, co-designations, electric or pneumatic switch indications, color, sound, light, and other designations, may take the place of the words and phrases shown on the chart and the keys as fully as those specifically illustrated herein.

Novel features of my invention will be more fully set forth and then pointed out in the claims.

Reference is to be had to the accompanying drawings forming a part hereof, wherein—

Figure 3 is an enlarged view of the portion of the chart shown in Figure 2;

Figure 1:
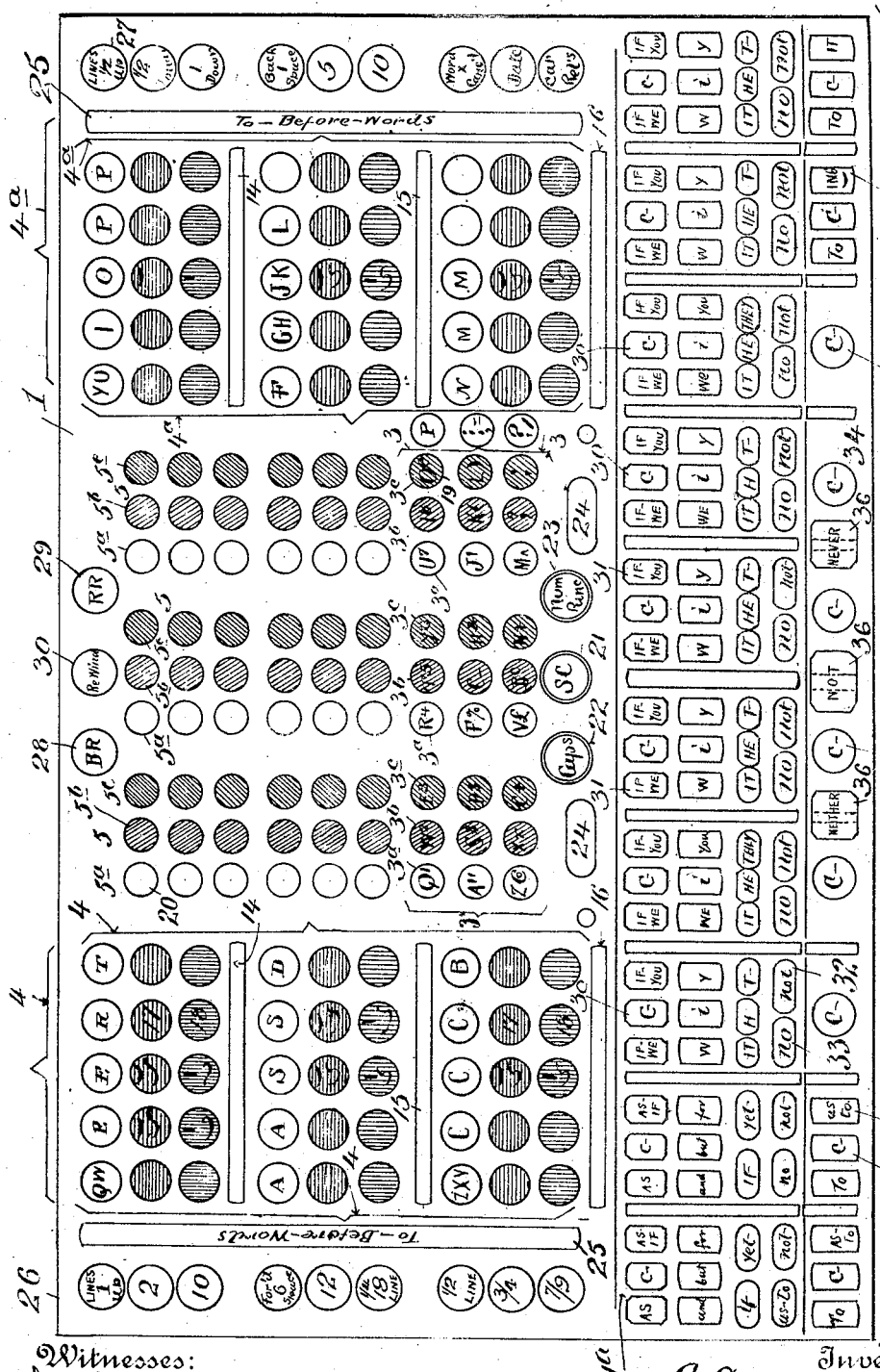
Figure 1 is a plan view illustrating my improved combined key-board.
Figure 11:
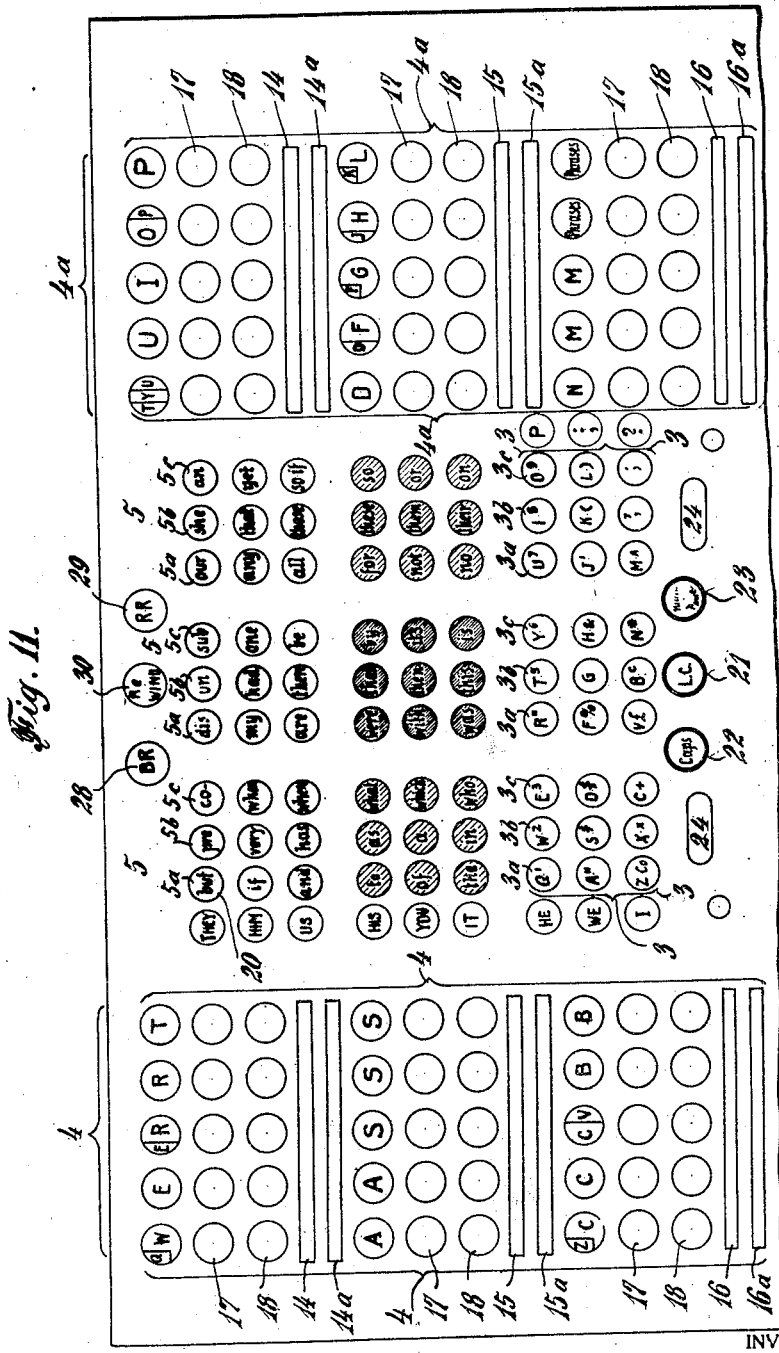

Figures 4, 4ª, when read together, illustrate a portion of the key-board and supplemental chart portion therebelow, said portion of the chart being adapted for use in conjunction with the portion of the key board shown in Figures 4, 4ª, and the central main portion of the key board shown in Figure 1 for special speed of writing, and the production of phrases, special or changeable technical terms, names etc., although a lower portion of the main chart and keyboard may be made to pertain to such technical terms etc., without relation to the supplemental parts referred to;

Figures 5, 6, 7 and 8 are enlarged details of rectangles of the vocabulary chart;

Figure 9 is a section on line 9, 9, in Fig. 4;

Figure 10 is a plan view illustrating a simple form of word chart;

Figure 11 is a plan view of a keyboard for use with Fig. 10; and Figs. 12, 13 and 14 are enlarged details of parts of Fig. 10.

Similar numerals of reference indicate corresponding parts in the several views.

The key-board 1 is provided with suitable keys and bars, the keys being arranged in definite horizontal and vertical columns and groups, and the bars co-related therewith as hereinafter explained, and at 2 is indicated the main chart portion having rectangles containing words indicated by their initial letter, and phrases may be included as well as words, and at 2ª is the auxiliary chart having rectangles containing words and phrases, grouped under special titles and not specifically desired in the chart 2. The keys bear direct relation to the words on the chart, but do not necessarily bear relation to the type of the machine. The chart 2ª however may instead of being a separate chart as shown, be attached removably to and form a detachable portion of chart 2. The set of keys, however, shown between the bracket 3 are indicated as provided with letter characters corresponding to the characters of the keys of an ordinary typewriting machine key-board, and preferably in substantially the same standard order, but additional characters may be provided on such keys if desired. The keys of the left hand group embraced within the brackets 4 and the keys within the right hand group embraced within the brackets 4ª are shown arranged in a plurality of series in horizontal and vertical columns of keys, one or more of which keys in each horizontal or vertical column in a group bear characters corresponding mainly to the characters of the ordinary typewriter key-board, such groups of keys at 4, 4ª being shown on opposite sides of a centrally disposed bank or series of keys 5, for convenience of operation and order, since the keys 5 between the groups 4, 4ª and above the groups 3 are the keys to be operated singly in conjunction with the operation of any one of the initial character keys of the right and left hand group 4, 4ª. While the keys within the groups 3 are indicated as provided with characters corresponding to the keyboard of an ordinary typewriter, as before stated, it will be understood, for use with the triple sections of the rectangles shown, that they are included within the columns of groups of keys 5 without reference to the letters upon the groups of keys 3 when the last named keys are to be utilized in conjunction with any key in the groups 4, 4ª, the same as the keys of the groups 5 not bearing such letters. But the keys of the groups 3 may form an entirely independent but single character key board. In the example illustrated it will be noted in the group of keys 4, for instance, that there are five keys in a horizontal row bearing characters, with a plurality of keys in a group under each such character key, each of such lower vertical column keys of the group corresponding to the initial character key thereabove. For instance, in the first group E to the left there are two keys beneath it (and a third or fourth may be added if desired), and there are two sets of groups of E keys because of the frequency of use of the words beginning with the letter E, and this pertains wherever the words of certain initial letters are of great frequency, such as words beginning with a, c, s and the like. Upon the chart portions 2 words are arranged bearing definite relation to the keys described. I have shown such words in groups in rectangular arrangement. For instance, words in general use are all arranged systematically on the word chart in rectangular arrangement under their initial characters, as indicated within the brackets 6, 6ª, 6ᵇ (Figure 2), there being a middle horizontal group of words represented by rectangles 6, an upper group of words represented by rectangles 6ª, and a lower group of words represented by rectangles 6ᵇ, and each rectangle is divided into a plurality of sections 7, 7ª, 7ᵇ, each rectangle having an initial letter, and the sections of each rectangle pertain to such initial letter, and these sections are what I term a middle horizontal section 7, an upper horizontal section 7ª and a lower horizontal section 7ᵇ, which section correspond horizontally and vertically upon the chart with respect to each individual rectangle. By prefererence, each group of three words in a section is in indented order, as shown. All such rectangles with their contained sections are substantially alike throughout the chart in conjunction with the sub-divisions of the sections as follows: Each section is divided into three vertical columns of words that are indicated by the short lines 8, 8ª, 8ᵇ, there being a central vertical column of words 8, a left-hand vertical column of words 8ª, and a right-hand vertical column of words 8ᵇ in each section, and these columns of words are in turn divided into a central horizontal third, indicated by the bracket 9, containing three words of each of said columns, an upper horizontal third, indicated by the bracket 9ª, containing three words of each column, and a lower horizontal third, indicated by the bracket 9ᵇ, containing three words of each such column, said vertical columns and horizontal columns of words being so spaced as to readily be distinguished in their relation of thirds vertically and horizontally. For instance, as illustrated, rectangles are so spaced apart both vertically and horizontally as to readily distinguish one from another; the sections within the rectangles are likewise spaced for the same purpose, and the words within the sections are preferably spaced in groups of three whereby three groups of sections in a rectangle and the nine vertically disposed words in each section, and the three groups of words of each column of nine words, are readily distinguished as to their positions. While the sections of the rectangles are illustrated as comprised in lines for the purpose of illustration, it will be understood that such lines need not bound the rectangles in the charts for use, but that the locations and relative positions of the groups of words in a rectangular arrangement of words will suffice without boundary lines for the sections, since the positions of the words of the sections may be distinguished by the spacing between the groups. By preference, the horizontally disposed rows of sections of the different horizontal series 6, 6ᵃ, 6ᵇ of rectangles are produced in contrasting colors, as for instance, the horizontally disposed middle sections 7 of the rectangles may be tinted light green, the upper horizontal rows of sections 7ᵃ may be white, and the lower horizontal rows of sections 7ᵇ may be gray, or any contrasting colors selected, whereby the eye will be readily guided to the section desired. Instead of the rows of sections 7ᵃ being white, every alternate one of such sections may have a contrasting color, or every alternate rectangle in its different tint may be printed heavier or lighter as desired for purpose of distinction between the sections vertically. Also, the least usable of the words may be printed in a thinner faced type or in a different or colored type.

It will be understood that all words beginning with a certain initial character, as for instance the letter E, are arranged in the rectangle having the large letter E designating it imprinted thereon, in one or more places in the rectangle, as in the central third, and such words are to be printed approximately alphabetically starting with the first upper word of the left-hand column 8ᵃ, ranging downwardly to the bottom of the rectangle; then the next column 8 following in order, through the middle column of the rectangle and through the last column to the last word at the bottom of the right-hand corner, or in any other approximate manner. While I have selected for illustration three sections in a rectangle and each section containing three columns of nine words each, it will be understood that the number of the sections in a rectangle and the number of the columns of words, and the words in a section, or in a column, in each rectangle, and its sections may be varied as desired. The rectangles themselves may be composed each of separate thin material, insertable and removable from their respective positions on the chart plate or frame, being detachably retained thereon in any suitable manner, such as that shown with relation to the lower chart, so that either or all of them may be readily altered or substituted, as may be required for making changes in names, addresses, terms, billing items, etc. In the event that there are more words, as for instance, (beginning with the letter E) than will go in the eighty-one allotted spaces of a rectangle, then the adjoining rectangle or a portion thereof also designated by such initial letter (E), as to the right of the first named rectangle, may contain remaining words beginning with such initial letter. If there are not enough words in general use for arrangement for a complete rectangle, then, as for instance, in words beginning with the letter Q (as shown in the rectangle containing the initial letters Q, W, Figs. 3 and 7) the words beginning with the letter Q may occupy the left-hand column only of the rectangle, and the words beginning with the letter W (of which more words are in general use than of the letter Q) may occupy two columns of such rectangle. Such arrangement may also apply to letters Y, U; G H; J K; and Z X V, or to others in such relation as the number of words desired for the chart beginning with a definite letter may apply. The word chart illustrated represents under its different and multiple initials a relative number of words and phrases in general use, and the number of words and phrases contained under such initial letters as they bear relation to other initial letters. This arrangement of position of words pertains also to phrases and to multiple numbers and for this purpose a separate section of the chart from that above described is provided, indicated within the brackets 10, (Figs. 4, 4ᵃ) wherein are illustrated desired phrases, parts of speech, technical terms, proper names, cities, States, dates, etc., and grammatical phrases, arranged in suitable order or groups and suitable indications of the positions thereof being provided upon the chart to readily guide the eye thereto.

Figure 2:
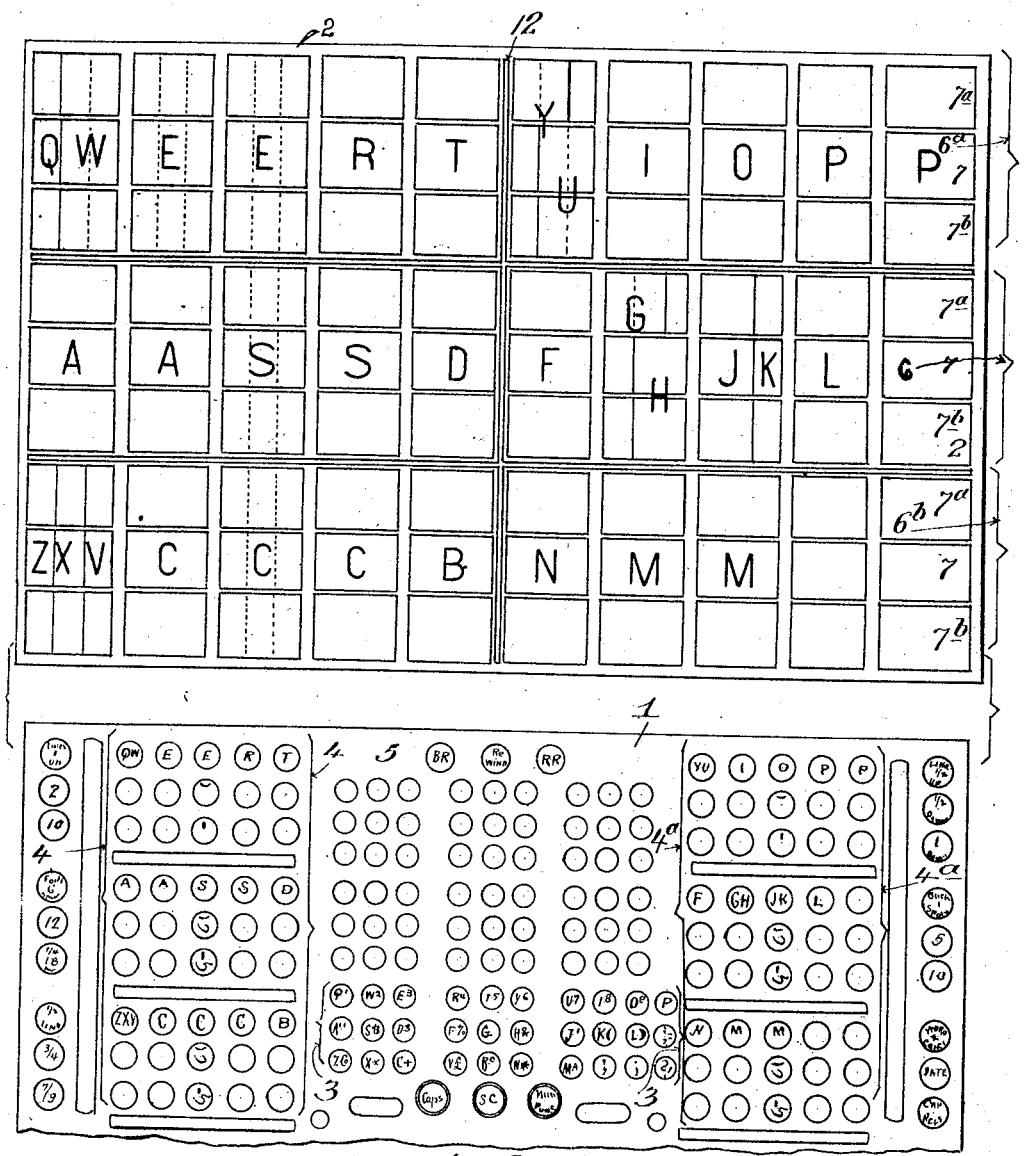
Figure 2 is a plan view illustrating the main portion of the keyboard in conjunction with the portion of the chart above the key-board bearing words arranged in groups under their corresponding initial characters.

The rectangles and sections of the portion of the chart 2 bear definite relation to the groups of keys 3, 4, 4ᵃ, 5 and the rectangles and sections of the portion 2ᵃ of the chart (within the brackets 10) bear definite relation to the groups of keys 3, 5, and the groups of keys therebelow indicated generally within the brackets 11. For convenience in operation the chart 2 will be disposed in proper relation to the main keyboard and above the same as in Figure 2, and the portion 2ᵃ of the chart will be below and in front of the key-board portion 11, as in Figures 4, 4ᵃ. The charts 2 of Figures 2 and 3 are shown divided into vertical halves by an intermediate space which may comprise any suitable lines or extra wide space 12, whereby each half of the chart is intended to correspond with the respective sections of keys 4 and 4ᵃ of the keyboard, which keys are shown substantially arranged in the standard keyboard order of letters. Hence, it will be understood that each group of vertically disposed three keys in section 4, 4ᵃ, correspond with the rectangles of the chart in the relative positions shown. It is contemplated that the operation of a key in section 4 or 4ᵃ in conjunction with an appropriate key in the middle setion 3, 5, will cause the operation of type to produce a selected word or phrase. It will be noted that each rectangle of the chart contains eighty-one printed words arranged in the order heretofore described, and that the middle key-board 3, 5, consists of eighty-one keys corresponding in number with the number of words in a rectangle. It will be further noted that the column arrangement of the key board 3, 5, comprises three groups of columns, each column of a group containing nine keys, and by preference the corresponding columns of keys of each group of columns are colored to correspond with the color of the sections of the chart. For instance, the left-hand column 3ᵃ, 5ᵃ of keys in each group of keys of the key-board 3, 5, are preferably white or light tinted keys to correspond in color and position with the columns of words in the upper section of a rectangle; the left-hand column of the middle group of keys corresponds in number and position with the nine words in the middle column of the upper section of the rectangle; the left-hand column of the left group of keys correspond with the nine words at the left-hand end of the upper sections of the rectangle; and the left-hand column of the right-hand group of keys correspond with nine words in the right column of the upper section of the rectangle. Likewise, the middle columns 3ᵇ, 5ᵇ of the three groups of keys 3, 5, correspond in color, position and number to the columns of words in the middle section of such rectangle, and the right-hand columns 3ᶜ, 5ᶜ of the groups of columns 3, 5, correspond in color, position and number to the columns of words in the lower section of the rectangles. For instance, where the upper sections of the rectangles are white the columns 3ᵃ, 5ᵃ will be white, and where the middle sections of the rectangle are green, the columns 3ᵇ, 5ᵇ will be tinted green, and where the lower sections of the rectangles are of purple color or other contrasting shade the columns of keys 3ᶜ, 5ᶜ will be correspondingly colored purple, or other contrasting shade.

There may be three left-hand columns of keys, each all white, corresponding to the three upper white ground sections of words; three green middle columns of keys of nine each for the three middle green ground sections of words, and three dark right-hand columns of keys of nine each for the three lower sections of words of the rectangle, or other corresponding arrangements.

Then again the entire upper horizontal group—the upper one third of the central bank keyboard 3, 5, comprising three groups of nine keys or twenty seven keys, may be made white to correspond with the upper white one third of the rectangles, which may also have the white background. The middle horizontal group of the twenty seven keys may be of green or other tint corresponding to the tint of the middle horizontal section of the rectangle, and the lower horizontal twenty seven keys may be dark or shaded to correspond with the shade or tint of the lower section of the rectangles, or may be differently shaded or tinted corresponding appropriately to each other.

As shown the columns 3, 5, are arranged in series of three vertical columns, the series being suitably spaced for distinguishing purposes. It will be noted that the keys are arranged in sub-groups of three corresponding with the sub-groups of words of three in a section. It will be noted that each key of the first horizontal three rows of sections 4, 4ᵃ is accompanied by one or more keys 17, 18 in vertical column order, and that a bar 14, 15, 16 is preferably disposed between the lower key of one series of alphabetically marked keys, and above the alphabetically marked keys of the next series therebelow and so on. Such keys 17, 18 are intended to produce words with certain suffixes simultaneously formed with the stem or full words under the initial letter of the key above, but without requiring the last named key to be operated, all of such keys under their initial letter key governing the same section, and all such keys being also initial letter keys, governing the corresponding word of the rectangle with the appropriate suffix automatically affixed thereto thereby. In some instances, the keys 17 or 18 will be touched in conjunction with the corresponding bar 14, 15, 16, (which bars may be one or more in number, although shown as single bars only), to produce words with different and of less used suffix form than those produced by the operation of the keys 17 or 18 without such bar. It will be understood, however, in all instances that when a key is operated, such as the S key with or without bar 15, or its corresponding suffix governing key 17 or 18, with or without the corresponding bar 15, one of the keys of the groups 3, 5, will also be operated and such letter key will correspond in position and color to the key of the portion 4ª of the key-board that corresponds in relative position to the selected word of the corresponding section of the rectangle bearing the initial letter of the word to be printed, and that the key of the board 3, 5, depressed in connection with the initial letter S key will be the same key that will be depressed in connection with the key 17 under the S key and the key 18 under the S key in conjunction with the bar or without the bar, to produce the different forms of the suffix-terminating words. As an illustration, assume that it is desired to print the word "succeed" as well as such word having its various suffixes. It will be seen that in the enlarged illustration of a rectangle of the chart in Figure 5, that the word "succeed" is located in the right-hand column of the lower section, and is the first word of the lower third of such column under the purple coloring. Having noted the position of such desired word from the chart, the operator, on the outer board 4 depresses the S key of the right-hand S column in the middle section of group 4, and in conjunction therewith depresses the purple key indicated at 19 in the right-hand column 3ᶜ of the central group of keys of the key-board, which it will be noted corresponds in position to the word "succeed" on the chart. Such conjoint operation of the said two keys will cause the mechanism of the machine to operate, which in turn will select and shift the corresponding combination forming mechanism in the machine, which will act upon and set the corresponding type to spell and impress the required word. If, however, it had been desired to produce the word "succeeding" (the word usually appearing in the common or stem form only on the word chart), the key 17 of the S column would have been pressed, instead of the lettered key S, in conjunction with the aforesaid key 19, and the type would be set and printed to produce the word "succeeding". If, however, it had been desired to print the word "succeeded", then the key 18 in the S column before mentioned would have been depressed, in conjunction with the key 19, and the word "succeeded" would have been printed. Had it been intended to produce a word having the same base or stem, but with a different suffix than that mentioned, then the bar 15 would be operated in conjunction with the key 17 or 18 (or even with the S key) of the aforesaid S column, with the operation also of the said key 19, whereupon the type would be set and printed to produce such word, it being understood that the suffix word governing keys have the suffixes indicated thereon, or adjacent thereto, and that the last referred to suffix would be indicated also upon or near the appropriate key, and that the operator will understand that the bar is to be operated in conjunction with either of such keys only to produce such extra or suffix words. In this manner the word "complain", "complaining", "complained", "complainingly", "complaint" (Fig. 6) may be produced by the touch of the appropriate keys in the C columns in conjunction with the appropriate key in the central key board 3, 5, in manner before described. As a further illustration it may be said that the depression of the S key in the left-hand S column, in conjunction with the key 20, being the upper key of the left-hand white column of keys in the section 3, 5, (corresponding to the upper left-hand word in the upper third of the upper section of the S rectangle of the chart) would produce the word "save", and so on if the key 17 of the left-hand S column had been depressed, in conjunction with the key 20, the word "saving" would be produced, and if the key 18 of such column had been depressed, in conjunction with the key 20, the word "saved" would be produced. In view of the foregoing illustration it will be understood that the words on the chart will be arranged in the most preferred order, and sequence, under the initial letter of the alphabet, as illustrated in Figure 5, and that to select the desired word for printing, the key of the section 4 or 4ª in conjunction with the key of the section 3, 5, each corresponding to the position of the selected word in the chart, will be conjointly operated.

While I have shown the section 3 of the center column of keys as adapted for use in the ordinary manner of typewriting, it will be understood that such keys, as before stated, are also utilized as a portion of the columns of keys 3, 5, but to shift from the use of such keys for one purpose or the other, as stated, I provide a key 21, which is adapted to shift the mechanism to cut out the formation of words or phrases and to cause the production of only the single characters as contained on the keys when the keys of section 3 are individually operated, without regard to any other keys. The key 21 has the designation S. C. for single characters, and key 22 may be used when the series of keys 3 are set for a single character to produce capitals, and the key 23 may be simultaneously used to cause the mechanism to produce numerals and punctuations.

No space key is needed between words of a mechanically spelled phrase or after mechanically spelled words, such spaces being automatically produced by appropriate mechanism. The keys or short bars 24 are intended to operate the feed of the carriage to produce a space after the spelled up word when using the single character keys. The key 22 marked "Caps" if depressed when using the machine as a word or phrase writer employing keys 3, 5, 4, 4ª, will begin any word or phrase with a capital letter.

The bars 25 when depressed in conjunction with a key of the series 4, 4ª will add the word "to" before the words produced by such bar in conjunction with the bar 3, 5, and simultaneously therewith, by depressing the bar 25 with the desired word key, in manner described with respect to the bars 14, 15, 16, in conjunction with the appropriate key of the columns 3, 5. The keys in the left-hand column indicated at 26 govern the feed of the carriage and of the paper. The column of keys indicated at 26 and 27 may bear designations corresponding to the different operations of the carriage, the ribbon, line spacing, etc., as may be required, according to the character of the work being done, and the keys are also shown at 28, 29, 30 indicating the character of the ribbons and rewinding of the same.

In order to expedite the writing and to reduce the number of words that would otherwise be required on the chart portion on what may be termed the vocabulary chart 2, the special keys of the auxiliary key board portion indicated at 11 are provided for use in conjunction with the chart portion 2ª, which chart portion is shown provided with rectangles containing sections, each section being divided into three vertical columns of words or phrases substantially in the manner described with respect to rectangles of vocabulary shaft portion E, but instead of the words or phrases in the rectangles following in the order of the letters of a keyboard, they are shown grouped under special titles or classifications, which are selected to produce facility of memorizing and operation, by which means many words subject to special classification may be omitted from vocabulary chart 2, such as pronouns, conjunctions, prepositions, adverbs, technical terms, commercial phrases, cities, States, colors, numbers, names, etc., and very forms, such as phrases containing pronouns and verbs and the like, can be utilized. The key-board portion 11 is divided into sections 11ª, each section containing a controlling key 30 shown bearing the conventional letter C and such sections 11ª also contain keys 31 bearing thereon indications for words and for prefix words or phrases. The controlling keys 30 are intended to bring into action, when operated, the corresponding mechanism, that will serve, in conjunction with the keys of the central group 3, 5, to produce the desired word or phrase to be printed on the corresponding section of the upper rectangles shown containing three sections. As an illustration, if the key 30, of the key-board section corresponding to the rectangle containing the auxiliary verbs "may", "can" and "must" (Fig. 4) be depressed, while at the same time a key of the central group 3, 5, corresponding to one of such words as the word "can" be depressed, (being the key 5ª at the upper left-hand corner of the central groups of keys 5), the word "can" will be produced, and so on through the central column of the middle and upper section of the middle upper rectangle of Figure 4 with respect to any of the words or phrases desired therein. Verb "to be" is worked out in all its combinations, as represented by the forms shown in the chart, Fig. 4ª. The words under the letter "can" are illustrated in abbreviated form in accordance with the index shown at the bottom of chart portion 2ª, and will be the same in horizontal and vertical directions under all the auxiliary verbs "may", "can", "must", "will", "shall", "might", "could", "would", "should", so that if any of such words or phrases are desired under any such sections of the rectangle, the corresponding key 30 will be depressed in conjunction with the key of the central group of keys 3, 5, that corresponds in position with the word or phrase selected in the appropriate rectangle of chart portion 2ª. For the sake of clearness, one column of words under "can", "shall", and "would" are illustrated, but it will be understood that they correspond under the other words of the similar rectangles. If, however, it be desired to print a prefix word or phrase in front of the words selected, then one of the keys 31 of the corresponding section is depressed instead of the corresponding controlling key 30. For instance, by depressing one of the keys 31 in conjunction with the appropriate key of the group 3, 5, the phrase "if you can" or "if you can be" will be produced, and the same in conjunction with the negative key 32 or 33 to produce such a phrase as "if you can not" by the simultaneous depression of a key 31 and 32, in conjunction with an appropriate key of the group 3, 5. The same applies to the keys 31 bearing other designations. The same relative arrangement applies with respect to other words or phrases upon the keys 31, 32, 33.

In the operation of chart 2ª illustrated in Figure 4ª the same relative arrangement of keys is utilized in conjunction with other words and phrases, such as those derived from the portion 2ᵇ in simple and phrase form, whereby the depression of the controlling key 30 or a key 31 alone, or in conjunction with a key 32 or 33, with the conjoint operation of a key in a group 3, 5, produces a corresponding phrase. This relative arrangement may be carried out through all the different forms of words to be produced, such as for prepositions, conjunctions, interrogations, etc.

For the production of the words and phrases' for commercial phrases, technical terms, names, numbers, addresses, etc., the lower portion of the chart portion 2 is divided into rectangles shown containing two sections, divided into columns of words arranged substantially in the manner set forth with respect to the chart portion 2, and arranged appropriately to the subjects referred to and for use in connection therewith and the lower key board 11 is provided with controlling keys 34, which, when depressed in conjunction with the depression of a key in the group 3, 5, corresponding in position to the position of the words or phrase in the selected rectangle, will produce the printing on the machine mechanism of such word or phrase. In conjunction with the controlling keys 34 are other keys 35 intended to cause the addition of words, prefixes or suffixes as desired, to the words or phrases at the lower section of the chart, such as by applying the word "to" or the words "as to" or the suffix "ing" by the operation of the key 35 without the operation of the key 34, but in conjunction with the appropriate key of the group 3, 5. At 36 keys are indicated bearing the words "neither", "never" and "not" in the section containing the controlling keys 34, and when the keys 36 are operated with a corresponding key 34 in conjunction with an appropriate key in the group 3, 5, the negative words "never", "neither" or "not" will be prefixed to the word or phrase produced by reason of the operation of the key 34.

While I have referred to the words on the chart as arranged in rectangles, that are divided into sections, and have illustrated rectangles and sections embraced within enclosing lines, it will be understood that this is mainly for illustration purposes, and that while lines may be used surrounding the words of the rectangles or their sections, by preference the chart will be made so that the groups of words will be produced without being enclosed within surrounding lines, as illustrated in detail in Fig. 8, and that to distinguish the groups of words from one another distinguishing spaces will be provided between word groups, and that appropriate spaces between the subdivisions of each three words of each section of the chart will be provided. Such arrangement enables the operator to readily, without confusion, observe the location on the chart of the desired word in the appropriate section of the corresponding rectangle. Furthermore, while the chart is shown provided with characters representing the conventional Remington or standard key board character arrangement, it will be understood that such characters may be omitted if desired, and that distinguishing key characters may be placed in any desired position and order and be of any kind.

The term "rectangles" as used herein is intended to mean the spaces embodying or containing groups of words, and as herein specifically set forth the rectangle embraces three sections of groups of words, each section containing three columns of nine words each, consisting of three complete vertical columns of words in a rectangle, that contains three sections of groups of words, the rectangles containing such groups of words being illustrated as contained under a main initial character of the words. It will be understood that the group of words and the particular relation of the rectangles and the sections containing the groups of words illustrated herein may be alternate, and that the number of words in a column on the chart, the number of columns in a section or group, the number of sections in a rectangle, and the subdivision of the words in the columns of the sections, as in groups of three, may be altered, and that the groups of keys on the keyboards may be correspondingly altered if desired. It will further be understood that a leading idea of this invention is that there is a controlling key in the groups of keys 4, 4ª, corresponding to each rectangle, and that there are keys in the central banks of keys corresponding in position and number to the words in the groups of the chart, whereby (by way of illustration), if a word of the E group is to be produced, the corresponding controlling key E of the group 4 which controls the words under the corresponding group of words, will be struck, and the key in the central bank corresponding in position and column order to the desired word of the word group on the chart will be operated in conjunction with said controlling key E.

In Figure 3 I have illustrated part of the horizontal rows of sections of the word groups or rectangles as colored to correspond to the colors of the keys of the central main key board, and have omitted coloring the chart throughout for the sake of clearness of illustration. Furthermore, while I have referred to the chart sections and keys as having contrasting colors, it will be understood that by the term "colors" I mean any desired tints or shades, or other distinguishing means.

In the groups of keys 4, 4ª, the horizontal rows of each section of keys, under the keys bearing the designating characters, may have contrasting colors, tints or shades. For instance, the horizontal rows of keys bearing the phonetic character "ing" may be colored blue, and the row immediately beneath bearing the phonetic character "ed" may be shaded red. This will enable the operator to readily distinguish the rows of keys bearing the "ing" and the "ed" marks, under each section of the key groups.

It will be understood that the lower portion of the chart illustrated in the accompanying drawings containing pronouns, phrases, commercial phrases, technical terms, etc., and particularly for the technical terms or trade names, may be produced upon different pieces of material, indicated at 40 (Figs. 4, 4ª and 9), which may be removed from the main chart and replaced in accordance with the character of the trade, profession, or the like to which such terms or phrases apply. The removable portion 40 may be retained in position by clips or the like 41 on the main chart (Fig. 9). It will be noted, also, that corresponding replacement of the mechanical portion of the combination forming mechanism of the machine will be made, as required, to correspond with such changed words or phrases of the lower chart portion.

While I have particularly set forth my improved chart and key board as applicable for use in connection with typewriting machines of the class known as word writing machines, it will be understood that this invention may be used for different purposes and apply to many different uses besides that specifically set forth. The chart, for instance, instead of containing words under the arrangement heretofore described in the spaces allotted for words and phrases may contain other suitable designations corresponding to the various classes of work, and corresponding designations may be placed on the keys, such as code or signal indications for signalling purposes, for electrical combinations, for railway switch controlling systems, for adding, calculating machines and the like, for setting numbers for visual indications or signals, and for other purposes, the keys and relative arrangement of the keys and indications therefor corresponding to the chart in the manner hereinbefore described with respect to words and phrases.

If a rectangle comprises, for instance, two sections only, (Fig. 10), corresponding to the upper and middle sections of the middle bank of keys, (Fig. 11), then this corresponding selecting and governing portion, and the lower one third (single character keyboard) portion, of such middle bank of keys, may each be used separately and independently without using a shift key, and the word-governing keys of such banks may be provided each with a word printed thereon or adjacent thereto. Fifty four words, (Fig. 11), constitute in themselves, a large portion of a language, estimated at over twenty-five percent of the whole, and representing, therefore, the most used words thereof. Each of such words would be produced by the simple depression of its word key.

It will be understood, also, that the suffix keys and the bars of the keyboard may, instead of governing suffixes, govern the setting and printing of initials and the multiples of numbers and items and other factors, such as multiples of toll charges or billing items, hours, yards of material, quantities, etc. To increase this capacity, one or more bars 14ª, 15ª, 16ª, may be included in the keyboard below each of the bars 14, 15, 16, (Fig. 11), which, together with the keys 4, 4ª, may produce increased suffixes or multiples of numbers, etc., and may be marked with such indications. To facilitate the selection of words or other designations on the chart, the least used words or items, etc., may be printed in a thinner faced or a colored type.

Some of the applications of this invention are for addresses, circular letter writing, for the selection and governing, with or without the impressing of type, of single or multiple columns of numbers, with and without words or names, singly or in groups, alone or combined with one or more columns of words or numerals, such as in computing, calculating, bookkeeping, payrolls, etc., with or without columns of deductions, the prorating of expenses, etc., in several columns singly or simultaneously; the recording or billing of purchases, sales, shipments, wages, etc., including the quantity, name of the article, charge, discounts, and tax amounts, and the similar billing of telephone toll charges, inclusive number of messages, place called, charge, tax, and code designations, etc., singly or combined; and for the purposes of selecting and controlling linotype type singly and in combination, in words and phrases, and for the purpose of controlling singly and in combination code, light, color, sound, or electric factors, and for whatever purposes to which the invention may apply, in which factors are intended to be selected, operated or controlled singly or in combinations, and set or impressed, or both, by the selections or manipulations of the keys of the keyboard, adjacent to or at a distance from such keyboard and chart. It is the intent that suitable designations corresponding to the various classes of work will be placed upon the chart and the corresponding keys.

It will be understood that the keyboard and the chart for certain purposes may be used independently of each other, and that the term rectangle as applied to one or more groups of indications comprising the chart means any group of characters and combinations thereof suitably arranged on the chart; also that the terms "word" or "words" and "phrase" or "phrases" as applied to the chart may mean any combination of characters of whatever kind.

It will also be understood that the term

"designation" as used in the specification and claims may mean any combination of characters that constitute a word or part thereof, a phrase, whole numbers, or combinations of both words and numbers, and any other style of characters or factors that may be necessary for identification and selection for the various classes of work.

The lower portion of the chart is described and shown as removable from its supporting plate or frame to allow the substitution of such portion of the chart having designations of different classes or characters pertaining to the different classes and kinds of work. It will be understood that this replaceable and removable feature of a portion of the chart may be applied equally to one or more rectangles of the main chart in order to allow these rectangles to be readily substituted for others bearing different styles or classes of indications. This feature permits of these rectangles being readily changeable as, for instance, in billing work, computing work, payrolls, accounts, etc., in which it may be desirable to readily change the names of articles and rates, figures, proportions thereof, etc.

The term "vertical" as applied to certain rows of keys, is used to distinguish such rows of keys from the horizontal row disposition of keys, and is intended to apply equally to keys arranged in approximately vertical or inclined or staggered order. These latter dispositions may apply likewise to the horizontal key rows, but the even order illustrated is preferred. The term designation as used by me is intended to mean any indication, whether single or multiple.

In the selection and production of words and phrases, etc., no feed shift key is used between a produced preceding word or phrase, etc., and the succeeding or following one, or between the words of a phrase, and no feed space shift key is illustrated in the drawings for use in connection therewith, the shift key shown being usuable only in connection with the single character keys of the single character keyboard.

The selection and operation of the keys of the keyboard, with relation to the designations of the chart, may be in accordance with the so-called "touch-system", and the designations on the keys relating to groups of designations on the chart, as well as the corresponding indicating designations on the chart, may be omitted.

Having now described my invention what I claim is:—

1. The combination of a keyboard having keys, with a chart having a group of words, certain of said keys having operative relation to said words, and certain of said keys comprising a single character keyboard.

2. The combination of a keyboard having keys, with a chart having groups of designations, certain of said keys having operative relation to a group of designations, and certain of said keys having operative relation to the designations of each group.

3. The combination of a keyboard having keys, with a chart having groups of designations, certain of said keys having operative relation to a group of designations, and certain of said keys having operative relation to a designation of each group, the last named keys corresponding in relative order and number to the order and number of the designations of a group.

4. The combination of a keyboard having keys, with a chart having groups of designations, certain of said keys when used in combination one with another having operative relation to certain of said designations, and certain of said keys adapted to be used singly and having operative relation to desired designations.

5. The combination of a keyboard having keys, with a chart having groups of designations, certain of said keys when used in combination one with another having operative relation to certain of said designations, and certain of said keys adapted to be used singly and having operative relation to desired designations, the said latter designations comprising character, disposed relative to said last named keys.

6. The combination of a keyboard having keys, with a chart indicating groups of words, certain of said keys having operative relation to a group of words, and certain other keys having operative relation to the words of each group.

7. The combination of a keyboard having keys, with a chart indicating groups of characters, certain of said keys having operative relation to a group of characters, and certain other keys having operative relation to the characters of each group.

8. The combination of a keyboard having keys, with a chart indicating groups of designations, one of said keys being in operative relation to a group of designations, and one of said keys being in operative relation to one of the designations of each group.

9. The combination of a keyboard having keys, with a chart indicating groups of characters, one of said keys being in operative relation to a group of characters, and one of said keys being in operative relation to one of the characters of each group.

10. The combination of a keyboard having keys, with a chart indicating groups of designations, one of said keys being in operative relation to a group of designations, and one of said keys being in operative relation to one of the designations of each group, and certain of said keys comprising a single character keyboard.

11. The combination of a keyboard having keys, with a chart indicating groups of designations, one of said keys being in operative relation to a corresponding group of designations, and one of said keys being in operative relation to one of the designations of such group.

12. The combination of a keyboard having keys arranged in rows, a plurality of rows of said keys having designations, keys disposed between rows of said keys having designations, with a chart provided with groups of designations corresponding in relative position and order to the keys related to said groups.

13. The combination of a keyboard having keys arranged in rows, a plurality of rows of said keys having designations, keys of the groups being disposed between rows of said keys having designations, with a chart provided with groups of designations, said groups of designations of the chart having designations corresponding relatively in position and location to the designations on said keys.

14. The combination of a keyboard having keys, with a chart having groups of designations, certain of said keys having operative relation to a group of designations, and auxiliary keys adjacent to said first named keys, said auxiliary keys having operative relation to a group of designations.

15. The combination of a keyboard having a group of keys and a bank of keys, with a chart having groups of words, each key of the bank of keys having relation to a word of the group of words of the chart.

16. The combination of a keyboard having keys arranged in rows, a plurality of rows of said keys having designations, keys of the groups being disposed between rows of said keys having designations, and bars adjacent to such keys, with a chart provided with groups of designations corresponding in position and location to the designations of said keys.

17. The combination of a keyboard comprising a plurality of banks of columns of keys, with a chart having groups of designations, each group of designations of the chart containing columns of designations the same in number as the keys in a column of said banks, said groups of designations being provided with characters indicating the initial letters of the designations of the corresponding groups.

18. The combination of a keyboard having keys, with a chart having groups of designations, certain of said keys and groups of designations of the chart bearing definite relation one to another, said groups of designations being provided with sections having contrasting colors, certain of said keys having colors corresponding to the colors of the different sections of the groups of designations of the chart.

19. The combination of a keyboard having banks of keys, with a chart having groups of designations, certain of said banks of keys and groups of designations of the chart bearing definite relation one to another, said groups of designations being divided into sections having contrasting colors, columns of keys of the different banks of the keyboard having colors corresponding to the colors of the different sections of the groups of designations of the chart.

20. The combination of a keyboard comprising a plurality of banks of columns of keys, with a chart having word groups, each word group containing columns of words the same in number as the keys in a column of said banks, said word groups being provided with characters indicating the initial letters of the words of the corresponding word group, said word group being divided into sections having contrasting colors, the columns of keys of the different banks having colors corresponding to the colors of the different sections of the word groups of the chart.

21. The combination of a keyboard comprising a plurality of banks of columns of keys, each bank containing a plurality of keys, with a chart having word groups arranged in rectangles, each rectangle containing a plurality of columns of words the same in number as the keys in a column of said banks, said rectangles being provided with characters indicating the initial letters of the words of the corresponding rectangle, said rectangles being divided into sections having contrasting colors, the left hand columns of keys of said banks having a color corresponding to one section of each rectangle, the middle columns of said banks having a color corresponding to the middle sections of said rectangles, and the right hand columns of keys of said banks having a color corresponding to the lower sections of said rectangles.

22. The combination of a keyboard comprising a plurality of banks of keys, each bank containing a plurality of keys, and groups of keys arranged on opposite sides of said banks of keys, a plurality of horizontally disposed rows of keys of said groups having characters, with a chart provided with rectangles containing columns of words, said rectangles being similar in number to the columns of keys in a group of keys, said rectangles being provided with characters indicating the initial letters of the words of the corresponding rectangle, said characters corresponding to the characters of said groups of keys.

23. The combination of a keyboard comprising a plurality of banks of keys, each bank containing a plurality of keys, and groups of keys arranged on opposite sides of said banks of keys, a plurality of horizontally disposed rows of keys of said groups having characters, with a chart provided with rectangles containing columns of words, said rectangles being similar in number to the columns of keys in a group of keys, said rectangles being provided with characters indicating the initial letters of the words of the corresponding rectangle, said characters corresponding to the characters of said groups of keys, said rectangles being divided into sections having contrasting colors, the columns of keys of the different banks corresponding to the colors of the different sections of the rectangles.

24. The combination of a keyboard having a plurality of banks of keys, each bank containing a plurality of keys, with a chart having word groups arranged in rectangles, each rectangle of the chart being divided into the same number of sections as there are banks of keys in the keyboard, each section of the chart having the same number of words as there are keys in a bank of the keyboard.

25. The combination of a keyboard having a plurality of banks of keys, each bank containing a plurality of keys, with a chart having word groups arranged in rectangles, each rectangle being divided into the same number of sections as there are banks of keys, each section having the same number of words as there are keys in a bank, each rectangle bearing a character corresponding to the initial letter of the words of the rectangle.

26. The combination of a keyboard having three banks of columns of keys, each column containing nine keys, with a chart having groups of words arranged in rectangles, each rectangle being divided into three sections, each section having three columns of words, each column of words being divided into a middle third, an upper third, and a lower third, each third containing three words, said sections of the rectangles of the chart having contrasting colors, the left-hand columns of keys of said banks having a color corresponding to one section of each rectangle, the middle columns of said banks having a color corresponding to the middle sections of said rectangles, and the right-hand columns of keys of said banks having a color corresponding to the lower sections of said rectangles.

27. The combination of a keyboard having groups of controlling keys, certain of said keys having characters, and banks of word keys adjacent to the controlling keys, with a chart provided with groups of words, said word groups of the chart having characters corresponding to the characters on controlling keys, words in said word groups of the chart corresponding in position and location to the word keys of said banks of keys.

28. The combination of a keyboard having groups of controlling keys, certain of said keys having characters, and extra keys of the same character disposed adjacent to said character keys, with a chart provided with groups of words, said word groups of the chart having characters corresponding to characters on said character keys and to the extra keys of the groups of controlling keys.

29. A keyboard having three banks of columns of keys, spaced apart, each bank containing three columns of keys, three horizontally disposed rows of keys of said three banks of keys bearing characters corresponding to a single character keyboard in combination with a chart indicating groups of characters.

30. A chart of the character described comprising rows of rectangles containing designations, the rectangles being separated from each other horizontally and vertically, each rectangle containing a plurality of columns of designations.

31. A chart of the character described comprising horizontal rows of rectangles containing words, the rectangles being separated from each other horizontally and vertically.

32. A chart of the character described comprising horizontal rows of rectangles containing words, the rectangles being separated from each other horizontally and vertically by suitable contrasting spaces, each rectangle containing a plurality of sections separated from each other by suitable spaces, each section containing a plurality of columns of words, said rectangles containing characters indicating the initial letters of the words of the corresponding rectangle.

33. A keyboard having a bank of keys, and having auxiliary keys arranged in sections, certain of said keys being in column order, each section having a controlling key and word keys, each section having a second controlling key and word keys associated therewith.

34. A keyboard having banks of keys, and having auxiliary keys arranged in sections, each section having a plurality of controlling and word keys, combined with a chart having sections containing words, said words corresponding in order to the keys of the banks of keys.

35. A keyboard having banks of keys, and having auxiliary keys arranged in sections, each section having controlling and word keys, combined with a chart having sections containing columns of words corresponding in number to the keys in the columns of a bank of keys, said chart having rectangles below said sections of keys.

36. A keyboard having banks of keys, and having auxiliary keys arranged in sections, each section having a controlling key and word keys, combined with a chart having sections containing columns of words corresponding in number to the keys in the columns of a bank of keys, said chart having rectangles below said sections of keys, said chart having an auxiliary portion provided with rectangles containing groups of words, said rectangles containing indications of parts of speech and other phrases and terms.

37. A keyboard having a bank of keys, and having auxiliary keys, and designations indicating said auxiliary keys, combined with a chart having sections containing words corresponding in relation to the key in the bank of keys.

38. A keyboard having a bank of keys, and having auxiliary keys, and designations indicating said auxiliary keys, combined with a chart having sections containing words corresponding in relation to the keys in the bank of keys, said chart having an auxiliary portion containing groups of words, said chart having indications of parts of speech and other phrases and terms pertaining to said auxiliary portion.

39. The combination of a keyboard having keys, with a chart having groups of words, certain of said keys and word groups of the chart bearing definite relation to one another, certain of said groups of words comprising verbs in single and phrase form.

40. The combination of a keyboard having keys, with a chart having groups of words, certain of said keys and word groups of the chart bearing definite relation to one another, said chart having a removable portion containing groups of words, and means for detachably connecting said removable portion to the chart.

41. A chart of the character described having a plurality of designations, said designations comprising a group, certain of said designations constituting separate subdivided portions of said group.

42. A chart of the character described having a plurality of designations, the said designations comprising a group, certain of said designations constituting separate subdivided portions of said group, the subdivided portions of said group comprising columns of designations.

43. A chart of the character described having a plurality of designations, the said designations being disposed in separate groups, a plurality of said groups being disposed in a plurality of rows.

44. A chart of the character described having a plurality of designations, the said designations being disposed in separate groups, a plurality of said groups being disposed in a plurality of horizontal and vertical rows.

45. A chart of the character described having a plurality of designations, the said designations being disposed in separate groups, said groups comprising related designations, each group having a designating character representative of the character of the designations contained therein, a plurality of said groups being disposed in a plurality of horizontal rows.

46. A chart of the character described having a plurality of designations, said designations comprising a group, certain of said designations constituting separate subdivided portions of said group, a sub-divided portion thereof comprising nine designations, said nine designations being separated into three sub-groups of three designations each.

47. A chart of the character described having a plurality of designations, said designations constituting a group, certain of said designations constituting separate subdivided portions of said group, said subdivided portions comprising columns of designations, said columns being vertically disposed and comprising a central column, a right hand column, and a left hand column of designations.

48. A chart of the character described having a plurality of designations, said designations comprising a group, certain of said designations constituting separate subportions of said group, a portion of said group having a distinguishing characteristic different from another portion of said group.

49. A chart of the character described comprising groups of designations, the designations of a group being disposed in three vertical columns, said columns comprising sub-groups of nine designations each, the said nine designations comprising three sub-designations of three designations each, the chart having intervening spaces between the columns of designations and between the sub-groups of designations.

50. A chart of the character described comprising groups of designations, a plurality of said designations comprising a sub-group, a portion of said sub-group comprising three separate designations.

51. A chart of the character described comprising a group of designations, a plurality of said designations comprising sub-groups, said sub-groups constituting an upper and lower section of said group.

52. A chart of the character described comprising a group of designations, a plurality of said designations comprising sub-groups, said sub-groups constituting upper, central and lower sections of said group.

53. A chart of the character described having a plurality of designations, said designations being disposed in groups, some of said groups being permanent, and means to detachably retain one or more of said groups of designations with relation to the permanent designations.

54. A chart of the character described comprising horizontal rows of rectangles containing words, the rectangles being separated from each other both horizontally and vertically by suitable contrasting spaces, each rectangle containing a plurality of sections separated from each other by suitable spaces, each section containing a plurality of columns of words, said rectangles containing characters indicating the initial letters of the words of the corresponding rectangle, said characters being arranged in three horizontal rows in the order of the characters of the keys of a single character keyboard.

55. The combination of a keyboard having keys, with a chart having a plurality of designations, certain of said keys and designations of the chart bearing definite relation to one another, said chart having a removable portion containing some of said designations, and means for detachably connecting said movable portion to the chart.

56. The combination of a keyboard having keys, with a chart having groups of designations, said designations comprising series of characters, certain of said keys and designations of the chart bearing definite relation one to another, the said chart having removable portions containing each a group of designations, and means for detachably connecting said removable portions to the chart.

CLYDE C. BALSTON.